(12) United States Patent
Bolan et al.

(10) Patent No.: US 6,647,480 B1
(45) Date of Patent: Nov. 11, 2003

(54) DATA BLOCK UPDATE UTILIZING FLASH MEMORY HAVING UNUSED MEMORY SIZE SMALLER THAN THE DATA BLOCK SIZE

(75) Inventors: Joseph E. Bolan, Morrisville, NC (US); Michael D. Washburn, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,452

(22) Filed: Mar. 31, 2000

(51) Int. Cl.[7] .............................................. G06F 13/00
(52) U.S. Cl. ...................... 711/170; 711/154; 709/203; 709/247
(58) Field of Search ............................... 711/100, 103, 711/154, 170; 709/200, 203, 247

(56) References Cited

U.S. PATENT DOCUMENTS

| | | | |
|---|---|---|---|
| 5,237,460 A | | 8/1993 | Miller et al. .................... 360/8 |
| 5,357,614 A | | 10/1994 | Pattisam et al. ............. 395/250 |
| 5,459,850 A | | 10/1995 | Clay et al. .............. 395/497.02 |
| 5,463,772 A | * | 10/1995 | Thompson et al. .......... 707/101 |
| 5,673,392 A | | 9/1997 | Nakashima et al. ... 395/200.01 |
| 5,701,492 A | | 12/1997 | Wadsworth et al. ......... 395/712 |
| 5,765,157 A | | 6/1998 | Lindholm et al. ........... 707/101 |
| 5,794,228 A | * | 8/1998 | French et al. ................... 707/2 |
| 5,822,524 A | * | 10/1998 | Chen et al. .................. 709/203 |
| 6,014,694 A | * | 1/2000 | Aharoni et al. ............. 709/219 |
| 6,292,827 B1 | * | 9/2001 | Raz ............................. 709/217 |

* cited by examiner

Primary Examiner—Tuan V. Thai
(74) Attorney, Agent, or Firm—John R. Pivnichny; William H. Steinberg

(57) ABSTRACT

Data stored in a block of first memory is updated over a LAN. The block is larger than the unused part of a second memory. After compressing the data it is transferred over a LAN to a device where the first and second memory are located. The data is decompressed in increments smaller than the unused part of the second memory and then written to the first memory.

13 Claims, 3 Drawing Sheets

DATA BLOCK UPDATE UTILIZING FLASH MEMORY HAVING UNUSED MEMORY SIZE SMALLER THAN THE DATA BLOCK SIZE

TECHNICAL FIELD

The invention relates to updating the data stored in a block of memory by sending the new data over a local area network (LAN) or other connection. More particularly, the invention relates to updating a data block which is larger than the size of the available unused portion of a second memory.

BACKGROUND OF THE INVENTION

Individual computers or processors are frequently interconnected using a local area network (LAN) so that data from one processor can be rapidly requested from or sent to another processor which is attached to the same LAN. A LAN connection typically operates at a higher speed than some other connections such as a telephone line dial-up modem. Because a LAN is always connected, the time required for dial up of an initial connection using a modem is eliminated. Other connections including a Point-to-Point Protocol (PPP) or Serial Line Information Protocol (SLIP) may also be used for transferring data.

For two or more computers to be connected via a LAN, each must have a LAN port connected to a cable routed between the respective LAN ports. Examples of LAN types currently in use are the ETHERNET® LAN and the TOKEN RING® LAN. (TOKEN RING is a registered trademark of International Business Machines Corporation.)

In addition to requesting and transferring data, a LAN may be used to transfer program code. The data and/or code may also be compressed before transmission across a LAN and subsequently decompressed after reception at the receiving computer. Various compression methods have been developed for this and other purposes such as run length encoding, Huffman coding and Lempel Ziv coding. After reception and both before and after decompression, the received data is stored in some type of memory or storage device. The memory may be RAM memory, ROM memory, EPROM, EEPROM or flash memory. Storage devices include a hard or floppy drive. A flash memory may also be configured to emulate a disk drive as described by Clay et al. in U.S. Pat. No. 5,459,850. Wadsworth et al. in U.S. Pat. No. 5,701,492 describe a EPROM arranged into separately erasable sectors.

Miller et al. in U.S. Pat. No. 5,237,460 describe a method of storing compressed and uncompressed data on a hard disk or semiconductor memory having multiple partitions of varying block size. Pattisam et al. in U.S. Pat. No. 5,357,614 describe data compression between compression and decompression storage in RAM using a coprocessor. A main processor CPU intervenes periodically to transfer the data e.g. to or from a tape drive, as the capacity of the compression and decompression storage becomes filled.

Nakashima et al. in U.S. Pat. No. 5,673,392 describe storing a plurality of communication programs after being compressed. A program, e.g. program code, to be executed is decompressed in a work area in a RAM memory and then stored in a ROM memory from which it may then be executed.

Lindholm et al. in U.S. Pat. No. 5,765,157 describe compressing and decompressing the execution data (code) of a plurality of threads of execution as needed. As a result more space is made available in the run time memory.

While use of a LAN connection with or without data compressing and decompressing can provide a rapid transfer of data and program code, other factors may inhibit or prevent loading and execution of code transfers. For example, on some specialized systems, an operating program may be running from a flash memory of limited size. Operating RAM space may also be limited. The operating program must be running Transmission Control Protocol/Internet Protocol (TCP/IP) code and network interface code to receive the code update, however because of these limitations it may be impossible to perform the receive and update process without stopping the system and manually loading the update from some other external device. Use of a PPP or SLIP connection also requires that the operating program be running TCP/IP code which occupies RAM space.

In accordance with the present invention, there is defined a new method and system for updating a block of program code over a LAN or other connection for systems which have unused memory which is smaller than the block of code. It is believed that such a method and system would constitute a significant advancement in the art.

OBJECTS AND SUMMARY OF THE INVENTION

It is therefore, a principal object of the present invention to enhance the code update art by providing a system with improved update capability.

It is another object to provide such a system having a high speed transfer rate and update without stopping the system.

Another object of the invention is to provide a method of performing a code update in a system with limited memory capacity.

These and other objects are attained in accordance with one embodiment of the invention wherein there is provided a method of updating over a LAN or other connection, a block of data stored in a first memory of a device having first and second memories, the second memory having an unused size smaller than the block of data, at least one of the memories being a non-volatile memory, with new data, comprising the steps of receiving across a connection, new data compressed by a client processor, receiving control data over the connection to the non-volatile memory of the device, resetting the device, erasing the block of data stored in the first memory, and in response to the control data, uncompressing the compressed new data into uncompressed data increments each smaller than the unused size of the second memory and writing the uncompressed data increments to the first memory.

In accordance with another embodiment there is provided a computer system for updating over a LAN or other connection, a block of data stored in a first memory of a device having the first memory and a second memory with the second memory having an unused size smaller than the block of data, at least one of the memories being a non-volatile memory, with new data comprising a client processor having the new data, a connection, a data compressor for compressing the new data into compressed new data and control data, means for transferring the compressed new data over the LAN to the second memory of the device, means for transferring the control data over the connection to the non-volatile memory of the device, means for resetting the device, means for erasing the first memory, and means for uncompressing, in response to the control data, the compressed new data into uncompressed data increments, each smaller than the unused size of the second memory and writing the uncompressed data increments to the first memory.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
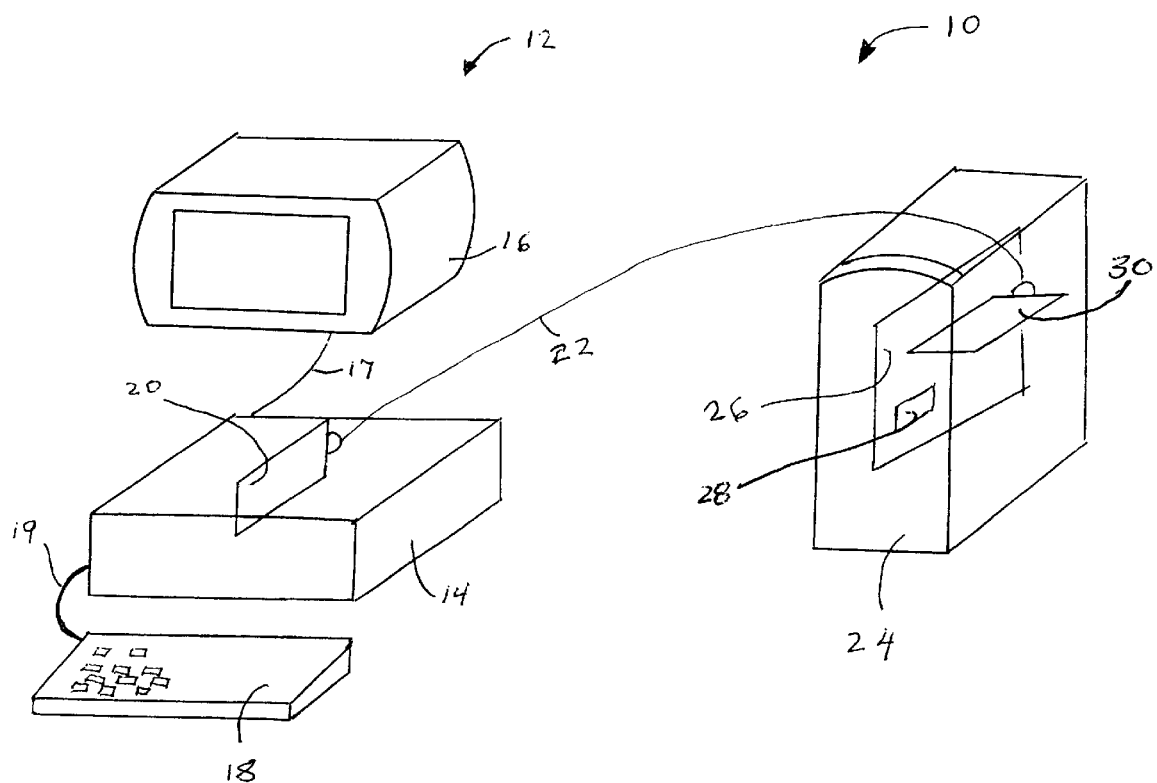
FIG. 1 illustrates a system for updating a block of data over a LAN in accordance with the present invention.

In FIG. 1 there is shown a computer system 10 in accordance with the present invention. Client processor 12 comprises a computer processor unit 14 which may have a display 16 attached through cable 17. Keyboard 18 may be attached via cable 19. Processor 14 has a LAN or other attachment device 20 with cable 22 attached. Client processor 12 may be a personal computer system, workstation, specialized processor, mainframe, laptop computer, handheld, or any other type of client unit capable of attaching to cable 22. Attachment device 20 and cable 22 may be part of an ETHERNET LAN, TOKEN RING LAN or any other type of local area network PPP, SLIP, or other connection.

Client processor 12 has a data compressor capability, preferably located in processor unit 14 for compressing data in any known compressing manner such as but not limited to run length encoding, Lempel-Ziv coding, or Huffman coding. The compressing capability may be provided by software, compression hardware or any combination capable of performing the particular compression manner selected.

Those skilled in the relevant art will recognize that LAN components 20, 22 and 30 can be a wireless LAN, infrared LAN or other type of connection without departing from the scope of the invention.

Client processor 12 has new data for updating the data or code in device 24. Device 24 is a computer processor of any type such as described above for client 12. A memory 28 in device 24 may be mounted on a motherboard 26 as shown in FIG. 1. There is both a first and second memory in device 24. The first memory has a block of data stored therein. First memory may be a non-volatile memory such as flash memory, EPROM, or EEPROM which has the advantage that if program code is stored there, then a program load is unnecessary when restarting device 24 from a power off condition. The second memory may be volatile such as RAM or non-volatile having an unused size smaller than the block of data stored in the first memory. LAN or other attachment device 30 connects to cable 22. The connection is capable of transferring both compressed and uncompressed data between devices attached to the interconnection such as 14 and 24 attached using 20 and 30 respectively.

Device 24 may be reset either manually or under program control. Device 24 also includes a decompression capability for performing the reverse process on data compressed in client processor 12. This capability may be provided in software, decompression hardware or any combination of the two regardless of the method used for compression in client processor 12.

Device 24 is capable of decompressing into data increments where each increment is smaller than the unused memory size in the second memory of 28. Such decompressing into increments may be performed in software or hardware also. Device 24 is also adapted to write these uncompressed data increments into the first memory of 28. Such writing would normally overwrite portions of data or code stored in the first memory and thereby update at least a portion of the data stored in the first memory.

Alternatively, the portions of data or code to be updated in the first memory, may first be erased before writing the uncompressed data increments into the first memory of 28. Those of ordinary skill in the art will also recognize that the new data may be stored in compressed format in increments into the first memory of 28. The new data would then be uncompressed at a later time such as when it is loaded into operating RAM for subsequent execution or use.

Figure 2:
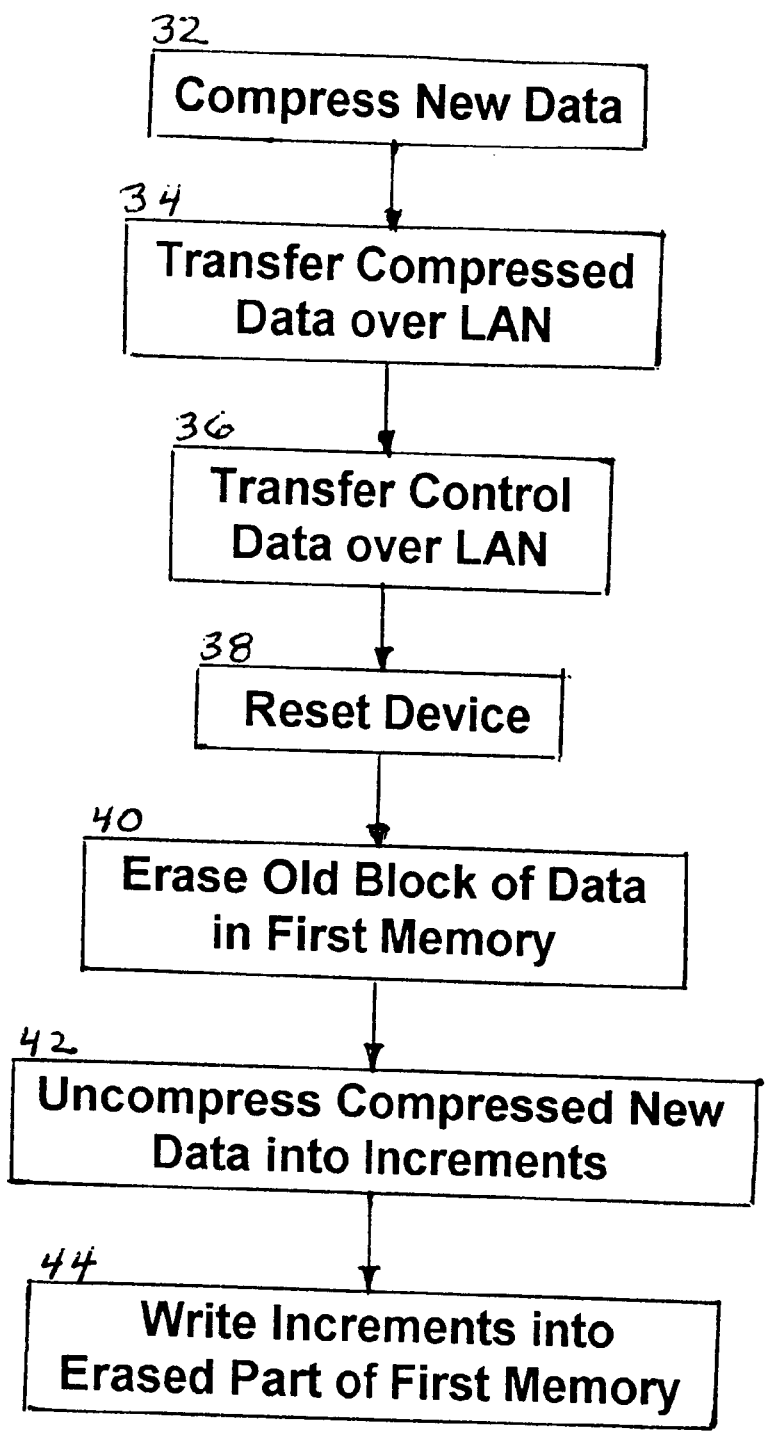
FIG. 2 is a flowchart describing the steps of a method for updating a block of data over a connection.

In FIG. 2 there in shown in accordance with another embodiment of the present invention, a flowchart of a method of updating over a LAN or other connection, a block of data stored in a first memory of a device having first and second memories with the unused size of the second memory being smaller than the block of data. In step 32 the new or updated data is compressed as described above, by a client processor. In step 34 the compressed data is transferred over a LAN to the device. In step 36 control data is transferred across the LAN in either a compressed or uncompressed manner. In step 38 the device is reset, preferably under program control. The block of data to be updated in the first memory is erased in step 40. In step 42 the compressed new data is uncompressed, as explained above, into increments. Each increment is smaller than the unused size of the second memory. Finally in step 44, the increments are written into the erased part of the first memory, thereby completing the update of the block of data.

Figure 3:
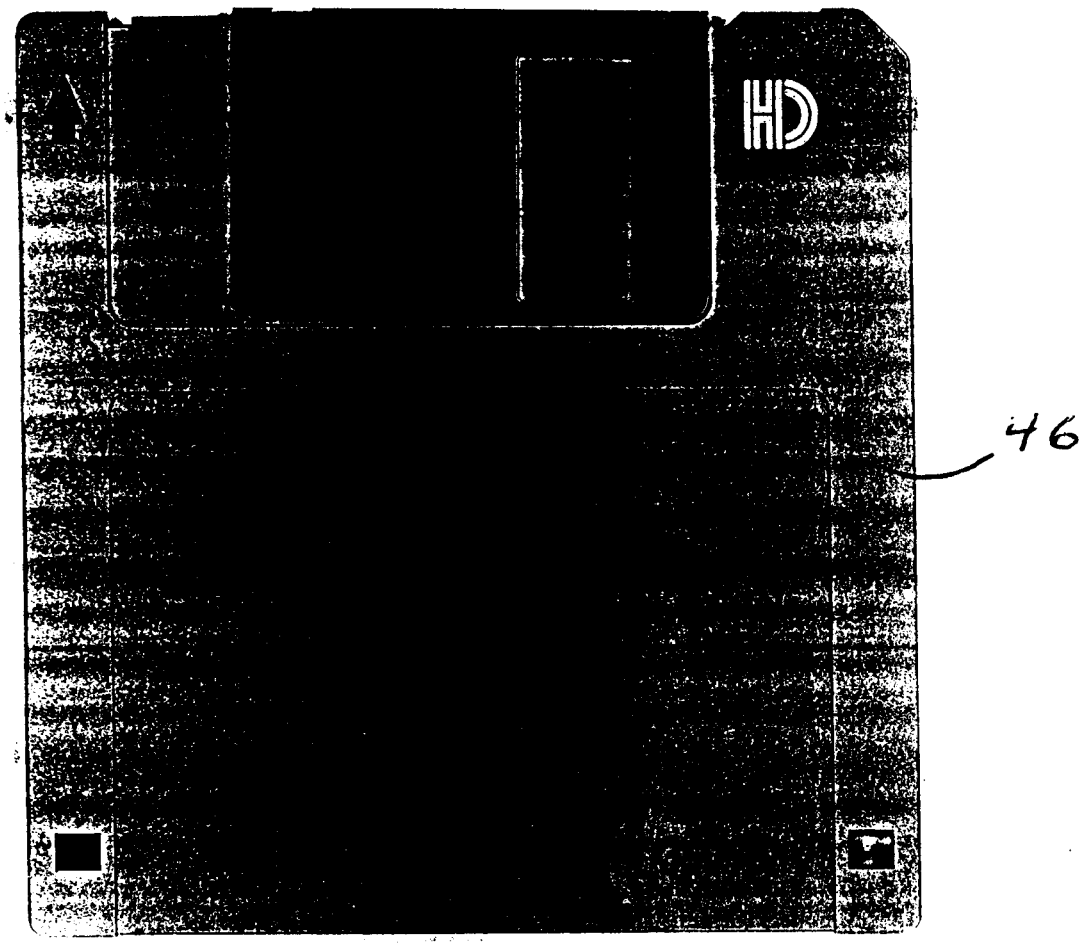
FIG. 3 is a computer readable medium.

In FIG. 3 there is shown a computer readable medium 46 for storing a computer program product in accordance with another embodiment of the present invention. Such medium may be a floppy diskette, zip diskette, CD or DVD disk, tape, smart card, PCMCIA card or any other type of computer readable medium.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of updating over a LAN, a block of data stored in a first memory of a device having first and second memories, said second memory having an unused size smaller than said block of data, at least one of said memories being a non-volatile memory, with new data, comprising the steps of:

receiving across a connection, new data compressed by a client processor;

receiving control data over said connection to said non-volatile memory of said device;

resetting said device;

erasing said block of data stored in said first memory; and in response to said control data, uncompressing said compressed new data into uncompressed data increments each smaller than said unused size of said second memory and writing said uncompressed data increments to said first memory.

2. The method of claim 1, wherein said new data is compressed by a client processor.

3. The method of claim 1, wherein said connection is a LAN.

4. The method of claim 1, wherein said uncompressing is performed by a processor in said device.

5. The method of claim 1, wherein said second memory is a flash memory.

6. A computer system for updating over a LAN, a block of data stored in a first memory of a device having first and second memories, said second memory having an unused size smaller than said block of data, at least one of said memories being a non-volatile memory, with new data, comprising:

a computer system device;

means for receiving across a LAN, new data compressed by a client processor;

means for receiving control data over said LAN to said non-volatile memory of said computer system device;

means for resetting said computer system device;

means for erasing said block of data stored in said first memory; and means for uncompressing, in response to said control data, said compressed new data into uncompressed data increments each smaller than said unused size of said second memory and writing said uncompressed data increments to said first memory.

7. A method of updating over a connection, a block of data stored in a first memory of a device having first and second memories with said second memory having an unused size smaller than said block of data, at least one of said memories being a non-volatile memory, with new data, comprising the steps of:

compressing said new data into compressed new data and control data;

transferring said compressed new data over said connection to said second memory of said device;

transferring said control data over said connection to said non-volatile memory of said device;

resetting said device;

overwriting said new data, in increments smaller than said unused size of said second memory, in response to said control data; and thereafter uncompressing said new data.

8. A computer system for updating over a LAN, a block of data stored in a first memory of a device having said first memory and a second memory with said second memory having an unused size smaller than said block of data, at least one of said memories being a non-volatile memory, with new data, comprising:

a client processor having said new data;

a LAN;

a data compressor for compressing said new data into compressed new data and control data;

means for transferring said compressed new data over said LAN to said second memory of said device;

means for transferring said control data over said LAN to said non-volative memory of said device;

means for resetting said device;

means for erasing said first memory; and means for uncompressing, in response to said control data, said compressed new data into uncompressed data increments, each smaller than said unused size of said second memory and writing said uncompressed data increments to said first memory.

9. The computer system of claim 8, wherein said means for compressing is located in said client processor.

10. The computer system of claim 8, wherein said LAN comprises a wireless LAN.

11. The computer system of claim 8, wherein said means for compressing is located in said device.

12. The computer system of claim 8, wherein said second memory comprises a flash memory.

13. A computer program product for instructing a processor to update over a LAN, a block of data stored in a first memory of a computer device having first and second memories, said second memory having an unused size smaller than said block of data, at least one of said memories being a non-volatile memory, with new data, said computer program product comprising;

a computer readable medium;

first program instruction means for receiving across a LAN, new data compressed by a client processor;

second program instruction means for receiving control data over said LAN to said non-volatile memory of said computer system device;

third program instruction means for resetting said computer system device;

fourth program instruction means for erasing said block of data stored in said first memory; and fifth program instruction means for uncompressing, in response to said control data, said compressed new data into uncompressed data increments each smaller than said unused size of said second memory and writing said uncompressed, data increments to said first memory; and wherein all said program instruction means are recorded on said medium.

* * * * *